(12) United States Patent
Hendricksen et al.

(10) Patent No.: US 9,710,542 B2
(45) Date of Patent: Jul. 18, 2017

(54) SYSTEM AND METHOD TO RETRIEVE RELEVANT INFORMATION

(75) Inventors: David Hendricksen, Eagan, MN (US); Michael Atton, Saint Paul, MN (US); Timothy William Hagedorn, Saint Paul, MN (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 992 days.

(21) Appl. No.: 12/649,853

(22) Filed: Dec. 30, 2009

(65) Prior Publication Data

US 2010/0169304 A1 Jul. 1, 2010

Related U.S. Application Data

(60) Provisional application No. 61/142,176, filed on Dec. 31, 2008.

(51) Int. Cl.
*G06F 17/30* (2006.01)

(52) U.S. Cl.
CPC .............. *G06F 17/30622* (2013.01)

(58) Field of Classification Search
USPC ...................................................... 707/742
See application file for complete search history.

(56) References Cited

U.S. PATENT DOCUMENTS

| 5,864,863 | A | 1/1999 | Burrows |
| 6,216,123 | B1 | 4/2001 | Robertson et al. |
| 7,319,994 | B1 * | 1/2008 | Sercinoglu |
| 7,542,966 | B2 * | 6/2009 | Wolf ........................ G06F 17/30 |
| 7,904,369 | B1 * | 3/2011 | Andreasen ............. G06Q 30/06 705/37 |
| 8,046,297 | B2 * | 10/2011 | Andreasen ............. G06Q 30/06 705/26.1 |
| 8,819,008 | B2 * | 8/2014 | Rose ................ G06F 17/30554 707/733 |
| 2005/0149516 | A1 * | 7/2005 | Wolf ................. G06F 17/30681 |
| 2008/0114759 | A1 * | 5/2008 | Yahia et al. ...................... 707/6 |
| 2008/0133473 | A1 * | 6/2008 | Broder et al. .................... 707/3 |
| 2009/0177685 | A1 * | 7/2009 | Ellis ................. G06F 17/30424 |
| 2011/0112928 | A1 * | 5/2011 | Andreasen ............. G06Q 30/06 705/26.8 |

(Continued)

OTHER PUBLICATIONS

International Search Report and Written Opinion for PCT/US2009/069805, dated Apr. 26, 2010.

(Continued)

*Primary Examiner* — Farhan Syed

(57) ABSTRACT

A method and system of retrieving information are disclosed. In accordance with the method, a plurality of information identifier (infoID) sets is generated based on at least one search term and at least one filtering criteria. The at least the plurality of infoID sets is joined according to a mathematical expression to form a resultant infoID set that includes at least one resultant infoID. At least a portion of a content document associated with the at least one resultant infoID is retrieved. At least one resultant infoID is summarized into at least one summary. The retrieved portion of the content document is summarized into the at least one summary of a combined result based on the associated at least one resultant infoID.

34 Claims, 8 Drawing Sheets

(56) References Cited

U.S. PATENT DOCUMENTS

| | | | |
|---|---|---|---|
| 2011/0231767 A1* | 9/2011 | Russell | G06F 17/3087 715/733 |
| 2012/0072300 A1* | 3/2012 | Andreasen | G06Q 30/06 705/26.5 |
| 2013/0066863 A1* | 3/2013 | Rose | G06F 17/30554 707/730 |
| 2013/0254160 A1* | 9/2013 | Rose | G06F 17/30554 707/609 |

OTHER PUBLICATIONS

Canadian Patent Office Action issued on Nov. 23, 2016, in corresponding Canadian Patent Application No. 2,750,199.
Response to Office Action filed on Apr. 18, 2016, in corresponding Canadian Patent Application No. 2,750,199.
Canadian Patent Office Action issued on Sep. 8, 2016, in corresponding Canadian Patent Application No. 2,750,199.
PCT International Preliminary Report on Patentability issued on Jul. 5, 2011.
Response to Office Action filed on Feb. 14, 2017, in corresponding Canadian Patent Application No. 2,750,199, 28 pages.
Notice of Allowance in corresponding Canadian Patent Application No. 2,750,199, 10 pages.

* cited by examiner

Primary DB 170 (or Secondary DB 176)

| Document Metadata<br>infoID = ID6<br>docID = docID1<br>verID = TS1 | Document Metadata<br>infoID = ID7<br>docID = docID2<br>verID = TS2 | Document Metadata<br>infoID = ID8<br>docID = docID3<br>verID = TS3 | Document Metadata<br>infoID = ID6<br>docID = docID4<br>verID = TS4 |
|---|---|---|---|
| Document Content<br>10 MN Stat. § 2500... | Document Content<br>12 NY Reg. Pt. 562... | Document Content<br>NY Sen. Bill 485 | Document Content<br>10 MN Stat. § 2500... |

FIG. 2A

Index DB 186

| Field Name | Value | docID | infoID | verID |
|---|---|---|---|---|
| Document Types | States Stats | docID1, docID4 | ID6, ID6 | TS1, TS4 |
| Jurisdictions | MN | docID1, docID4 | ID6, ID6 | TS1, TS4 |
| Document Types | State Regs | docID2 | ID7 | TS2 |
| Jurisdictions | NY | docID2 | ID7 | TS2 |
| Search Text | Srch1 | docID1, docID3, docID4 | ID6, ID8, ID6 | TS1, TS3, TS4 |
| Search Text | Srch2 | docID2 | ID7 | TS2 |

FIG. 2B

NORM DB 188

| Relationship ID | Base Topic | Target infoID | Type | Relevancy |
|---|---|---|---|---|
| R1 | T1 | -- (Self Ref.) | Topic | -- |
| R2 | T2 | -- (Self Ref.) | Topic | -- |
| R3 | T3 | -- (Self Ref.) | Topic | -- |
| R5 | T5 | -- (Self Ref.) | Topic | -- |
| Rx+1 | T1 | ID6 | Classification | 86% |
| Rx+2 | T1 | ID7 | Classification | 73% |
| Rx+3 | T2 | ID6 | Classification | 95% |
| Rx+4 | T3 | ID6 | Classification | 64% |
| Rx+5 | B1 | ID8 | Bill Family | 100% |

FIG. 2C

NORT DB 190

| Relationship | Child | Parent | Key | Value |
|---|---|---|---|---|
| N1 | C1 | P1 | TopicExpression | T1UT2 |
| N2 | P1 | Null | -- | -- |

FIG. 2D

| Select Topic(s): ~312 | Search Terms: ~302 |
|---|---|
| ☒ Topic 1 | ┌─────────────────────────┐ |
| ☐ Topic 2 | │ Srch1 or Srch2          │ |
| ☐ Topic 3 | └─────────────────────────┘ |
| ☐ Topic 4 | Document Types: ~304 |
| ☒ Topic 5 | ☐ Fed. Stats  ☐ Fed Regs  ☐ Fed Bills  ☐ Agency Decisions |
|  | ☒ State Stats  ☒ State Regs  ☐ State Bill |
|  | Document Sections: ~306 |
|  | ☐ All  ☐ Summary  ☐ Credits |
|  | ☐ Title/Header  ☐ Text  ☐ Notes of Decisions |
|  | Dates: All [Change] ~308 |
| ☐ Topic X | Jurisdictions: All [Change] ~310 |
| *Topic Search:* | |
| ┌──────────────┐ ~314 | Search Input Window 300 |
| │ Srch3        │ | |
| └──────────────┘ | |

FIG. 3

Trm1=Srch1; Cx=or; Trm2=Srch 2; Tpk1=Topic 1; Cx=or; Tpk2=Topic 5; Typ1=State Stats; Cx=or; Typ2=State Regs

FIG. 5A

Trm1=ID6, ID8; Cx=or; Trm2=ID7; Tpk1=ID6, ID7; Cx=or; Tpk2=Null; Typ1=ID6; Cx=or; Typ2=ID7

FIG. 5B

```
Set A (search terms)      = ID6, ID7, ID8
Set B (topics)            = ID6, ID7
Set C (doc types)         = ID6, ID7
Set D (aggregation sys.)  = ID6
Set E (suggestion sys.)   = ID7
Set F (user exclusions)   = ID8
```

(((Set A ∪ Set D ∪ Set E) ∩ Set B ∩ Set C) − Set F) = ID6, ID7

FIG. 5C

SYSTEM AND METHOD TO RETRIEVE RELEVANT INFORMATION

CROSS-REFERENCE TO RELATED APPLICATIONS

This application claims benefit of U.S. Provisional Application Ser. No. 61/142,176 filed on Dec. 31, 2008, which is incorporated herein by reference in its entirety.

BACKGROUND

Field of Technology

The present application relates generally to information retrieval systems. More specifically, the present application is directed to an information retrieval system and method to improve retrieval of relevant information.

Brief Description of Related Art

An information retrieval system generally retrieves information from one or more content data stores (databases) in response to a user query. The retrieved information can include, for example, one or more documents or portions thereof, which match the user query. A variety of information can be maintained in the content databases, such as documents, images, or videos, as well as other types of information.

Information retrieval systems can relate to different fields of practice or types of information. For example, there are a number of information retrieval systems that provide retrieval of relevant information in the field of law. These information retrieval systems invariably maintain vast collections of law-related information sources, such as case law, statutes, regulations, legislative bills, both federal and state, as well as other law-related information, across one or more databases of the information retrieval systems.

Typically, a user query can be restricted to one information source, such as the Code of Federal Regulations (CFR), or multiple information sources, such as Federal Statues and Regulations. However, the user query is resolved against all documents (e.g., titles, sections, parts, appendices, etc.) of the one or multiple information sources. There is no opportunity to restrict the search to only those documents of the information source(s) that are related to one or more particular topics with which the user query is to be associated, such as "information technology." Accordingly, such searches are not as useful to the user because they tend to retrieve a multiplicity of documents.

Typically, retrieved information (result) is provided to the user as listing of documents, which can be displayed according to relevancy of the documents with respect to the user query. The listing can have documents from the multiple information sources interspersed in the listing. Accordingly, the relationship of the documents to the relevant information sources or particular topics is not apparent. Moreover, there is limited opportunity to discover additional information sources or topics from such retrieved information.

SUMMARY

In accordance with an embodiment, a method of retrieving information is disclosed. In accordance with the method, a plurality of information identifier (infoID) sets is generated based on at least one search term and at least one filtering criteria. The at least the plurality of infoID sets is joined according to a mathematical expression to form a resultant infoID set that includes at least one resultant infoID. At least a portion of a content document associated with the at least one resultant infoID is retrieved. At least one resultant infoID is summarized into at least one summary. The retrieved portion of the content document is summarized into the at least one summary of a combined result based on the associated at least one resultant infoID.

In accordance with another embodiment, a system to retrieve information is disclosed. The system includes a primary search device, a secondary search device and a combiner device. The primary search device is configured to generate a plurality of information identifier (infoID) sets based on at least one search term and at least one filtering criteria. The primary search device is also configured to join at least the plurality of infoID sets according to a mathematical expression to form a resultant infoID set that includes at least one resultant infoID. The primary search device is further configured to retrieve at least a portion of a content document associated with the at least one resultant infoID. The secondary search device configured to summarize the at least one resultant infoID into at least one summary. The combiner device configured to combine the retrieved portion of the content document into the at least one summary of a combined result based on the associated at least one resultant infoID.

In accordance with yet another embodiment, a machine-readable storage medium is disclosed. The machine-readable storage medium includes operational instructions that, when executed by a processor, cause the processor to generate a plurality of information identifier (infoID) sets based on at least one search term and at least one filtering criteria. The machine-readable storage medium also includes operational instructions that, when executed by a processor, cause the processor to join at least the plurality of infoID sets according to a mathematical expression to form a resultant infoID set that includes at least one resultant infoID.

The machine-readable storage medium further includes operational instructions that, when executed by a processor, cause the processor to retrieve at least a portion of a content document associated with the at least one resultant infoID. Additionally, the machine-readable storage medium includes operational instructions that, when executed by a processor, cause the processor to summarize the at least one resultant infoID into at least one summary. Moreover, the machine-readable storage medium includes operational instructions that, when executed by a processor, cause the processor to combine the retrieved portion of the content document into the at least one summary of a combined result based on the associated at least one resultant infoID.

These and other purposes, goals and advantages of the present application will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings in which:

FIGS. 2A-2D illustrate example records in a plurality of backend databases of an information retrieval system illustrated in FIG. 1 in relation to an example query illustrated in a search input window of FIG. 3;

FIG. 3 illustrates an example search input window to receive a user query;

FIG. 5A illustrates an example query generated in accordance with the query illustrated in the search input window of FIG. 3;

FIG. 5B illustrates the example query of FIG. 5A translated into a query of information identifiers (infoIDs) in accordance with at least one relationship database illustrated in FIG. 1.

FIG. 5C illustrates at least one infoID set generated from the query of FIG. 5B, at least one additional infoID set retrieved from at least one system of FIG. 1, as well as a resultant infoID set generated from the infoID sets according to a mathematical expression;

DETAILED DESCRIPTION

An example information retrieval system and method to retrieve relevant information are disclosed herein. In the following description, for the purposes of explanation, numerous specific details are set forth in order to provide a thorough understanding of example embodiments. It will be evident, however, to one skilled in the art, that an example embodiment may be practiced without all of the disclosed specific details.

Figure 1:
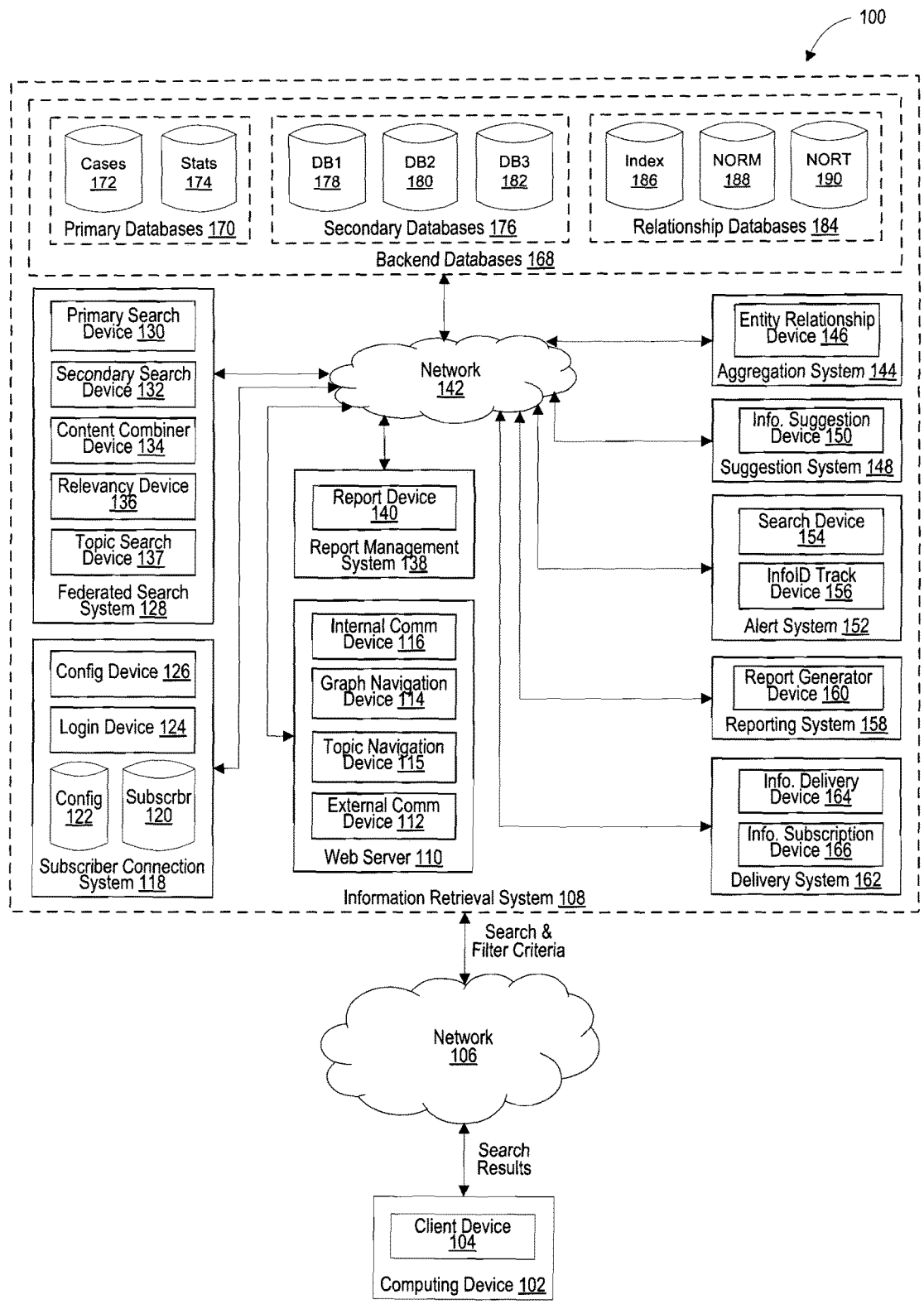
FIG. 1 illustrates a block diagram of an example system configured to provide retrieval of relevant information.

FIG. 1 illustrates a block diagram of an example system 100 configured to provide retrieval of relevant information. The system 100 can be a server-client system. The system 100 includes at least one computing device 102, a network 106 and an information retrieval system 108.

The at least one computing device 102 can include a personal computer that is configured to communicate with the information retrieval system 108 via the network 106 to provide a user of the computing device 102 with relevant information, such as for example, relevant information in the field of law. The at lest one computing device 102 can include a client device 104 (e.g., Internet Explorer®), which can execute one or more applications associated with the system 100. For example, the client device 104 can execute an application to transmit information entered by the user via the computing device 102 to the information retrieval system 108, as well as to receive (and display) information from the information retrieval system 108 to the user via the computing device 102.

More specifically, the client device 104 can communicate with the information retrieval system 108 to display one or more web pages to the user associated with retrieving relevant information from the information retrieval system 108. For example, the client device 104 can display one or more web pages to receive a search and filter criteria from the user and to transmit the received search and filter criteria to the information retrieval system 108. As another example, the client device 104 can further display one or more web pages to present search results (or relevant information) received from the information retrieval system 108, such as for example, in response to the transmitted search and filter criteria. The web pages can be displayed via hypertext markup language (HTML), extensible markup language (XML), extensible HTML, and/or other markup languages, as well as any other technology now available or to be deployed in the future.

The client device 104 can also execute a file transfer protocol (FTP) to receive one or more documents of relevant information via FTP, such as in portable document format (PDF) or another format. The computing device 102 is configured to display such documents. Additionally, the client device 104 can also execute one or more plugins that enable the client device 104 to receive and display one or more documents of relevant information from the information retrieval system 108. For example, the client device 104 can include a PDF plugin, Word plugin, Excel plugin, or any other plugin to receive and display documents of relevant information from the information retrieval system 108.

Furthermore, the client device 104 can also execute an email application to receive relevant information from the information retrieval system 108 via an email server (not shown) associated with the information retrieval system 108. The relevant information can be included in the body of one or more emails or can be attached to the emails as one or more documents of one or more formats, such as PDF, Word, Excel or other relevant formats. The computing device 102 is also configured to display such attached documents. The client device 104 can also execute an application to subscribe to and receive real simple syndication (RSS) feeds that publish relevant information from the information retrieval system 108 based on periodically performed searches, as will be described below in greater detail with reference to the information subscription device of the delivery system 162.

The network 106 is configured to transmit one or more messages associated with retrieving relevant information of the information retrieval system 108. The transmission over the network 106 can be accomplished, for example, via Transfer Control Protocol/Internet Protocol (TCP/IP), User Datagram Protocol (UDP)/IP, Hypertext Transfer Protocol (HTTP), File Transfer Protocol (FTP), as well as any combination of conventional protocols or protocols deployed in the future.

The information retrieval system 108 is generally configured to retrieve relevant information and to provide the retrieved information to the client device 104 of at least one computing device 102 via the network 106. The information retrieval system 108 includes a web sever 110, subscriber connection system 118, federated search system 128, report management system 138, network 142, aggregation system 144, suggestion system 148, alert system 152, reporting system 158, delivery system 162, and backend databases 168.

The web sever 110 is generally configured to communicate with the client device 104 of the at least one computing device 102 concerning retrieval of relevant information from the information retrieval system 108. The web sever 110 includes an external communication device 112, graphical navigation device 114, and internal communication device 116.

The external communication device 112 is configured to communicate information between the web server 110 and the at least one computing device 102. For example, the external communication device 112 can transmit one or more web pages to the client device 104 in order to receive from the user information or indications associated with retrieval of relevant information (e.g., search results) from the information retrieval system 108. The received information can include login information, configuration information, search information, as well as other information associated with the retrieval of relevant information. The received indications can include display navigation indications, relevance indications, as well as other indications associated with the retrieval of relevant information. Likewise, the external communication device 112 can also transmit one or more web pages (or documents) to the client device 104 in order to display the search results via the client device 104.

The graphical navigation device 114 is configured to receive one or more indications from the client device 104 via the external communication device 112 and to convert the search results displayed via the client device 104 between a textual display and a graphical display, as will be described in greater detail below with reference to FIGS. 6 and 7. In those embodiments where the search results are transmitted via one or more web pages, additional one or more web pages can be transmitted to the client device 104 to display the search result in a textual or graphical format. In other embodiments where the search results are transmitted via one or more documents, additional one or more documents can be transmitted to the client device 104 to display the search result in a textual or graphical format.

The topic navigation device 115 is configured to receive one or more indications from the client device 104 via the external communication device 112 concerning a topic of the results displayed in FIG. 6 and to display a topic map window including at least a topic map related to the topic, as will be described in greater detail below with reference to FIGS. 6 and 8.

The internal communication device 116 is configured to communicate information between the web server 110, component systems 118, 128, 138, 144, 148, 152, 158 and 162, and backend databases 168 of the information retrieval system 108.

The subscriber connection system 118 is configured to identify the user and to maintain user's configuration concerning retrieval of relevant information within the information retrieval system 108. The subscriber connection system 118 includes a subscriber database 120 and configuration database 122, as well as a login device 124 and configuration device 126.

The subscriber database 120 is configured to store username/password and associated user ID combinations for multiple users to enable authentication of users to use the information retrieval system 108. The configuration database 122 is configured to store user IDs and associated configuration information to enable authorization of the users to use certain information sources (e.g., content databases), such as via filtering criteria, as will be in greater detail below with reference to FIG. 3. Additional configuration information associated with the users (via user IDs) can include user-configured search exclusion listings (e.g., user-defined filtering criteria) and information (e.g., document) delivery options, as will be described in greater detail hereinbelow.

The login device 124 is configured to login the user into the information retrieval system 108. More specifically, the login device 124 can transmit one or more web pages (e.g., login web pages) via the web server 110 to the client device 104 in order to receive identification information (e.g., username and password) that identifies the user via the client device 104. The login device 124 can authenticate the user to access the information retrieval system 108 (via user-name/password) and further to authorize the user to use certain information sources of the information retrieval system 108 (via configuration information maintained in configuration database 122). The subscriber connection system 118 can maintain user identifiers (user IDs) which can indicate the users who are logged in to the information retrieval system 108.

The federated search engine 128 is configured to receive search and filtering criteria (e.g., query) from the client device 104 or the alert system 152, as well as additional filtering criteria from at least one other system 118, 144 and 148. In some embodiments, further filtering information can be received or used (e.g., relevancy and timestamp) to refine the search, as will be described in greater detail below The federated search engine 128 is further configured to perform a search using at least one relationship database 184 against at least one content database (e.g., primary database 170, secondary database 176 or another content database) to retrieve at least one document (or portion thereof) based on the query (search and filtering criteria) and additional filtering criteria, to summarize the retrieved at least one document (or a portion of the document), and to return the summarization and the retrieved at least one document (or the portion of the document) to the client device 104 or the alert system 152. As will be described in greater detail below, the documents of the content databases are associated with information identifiers (infoDs) and the federated search engine 128 is configured to search, summarize and retrieve documents in association with the infoIDs. Additional identifiers (e.g., docIDs) can be associated with the infoIDs to facilitate retrieval of content documents or portions thereof associated with the infoIDs.

The federated search engine 128 includes a primary search device 130, secondary search device 132, content combiner device 134, relevancy device 136, and a topic search device 137. The primary search device 130 is configured to convert the query (search and filtering criteria) (e.g., the query illustrated in FIG. 5A) into multiple infoID sets (e.g., illustrated in FIG. 5C) based on at least one relationship database 184, to retrieve at least one additional infoID set (filtering criteria) from at least one other system (e.g., subscriber connection system 118, aggregation system 144, suggestion system 148). The additional infoID sets from the systems 144, 148 can be based on the at least one search term of the query, while the additional infoID set from the subscriber system 118 can be associated with a user-defined filtering criteria retrieved from the configuration database 122 for the user, such as via the user's user ID.

The primary search device 130 is also configured to join the plural sets of infoIDs from the various sources into a resultant infoID set according to mathematical expression (e.g., illustrated in FIG. 5C), as will be described in greater detail below with reference to FIGS. 3-5. The search device 130 is additionally configured to filter the resultant infoID set via the relevancy device 136 based on relevancies of constituent infoIDs. Furthermore, the primary search device 130 can additionally filter the resultant infoID set according to a received timestamp. The primary search device 130 is further configured to retrieve from the at least one content database (e.g., primary databases 170, secondary databases 176 and/or any other content database(s)) at least one document or portion thereof (document content) associated with an infoID of the resultant infoID set (as filtered). The foregoing allows a more useful search because the query and subsequent search result can be restricted effectively to those documents that the user is interested in as opposed to a search result that includes a multiplicity of documents that is not restricted.

The secondary search device 132 is configured to summarize the resultant infoID set (e.g., as filtered by relevancy and/or timestamp) against at least one relationship database 184 into at least one summary by topic, table of contents (TOC), document type, or other summary against at least one relationship database 184.

The content combiner device 134 is configured to combine the document content retrieved by the primary search device 130 and the at least one summary into a combined search result. The content combiner device 134 is further configured to return the combined search result to the client device 104 (via web server 110) or the alert system 152 via the network 142.

The relevancy device 136 is configured to adjust documents (or portions) thereof (via associated infoIDs) that are considered to be included in or excluded from the combined search result based on relevancies provided via the at least one relationship database 184 (e.g., the NORM database 188) and a desired relevancy, (e.g., documents having a relevancy of at least 60%). For example, if an infoID's relevancy is lower than the desired relevancy, the infoID is excluded from the resultant infoID set. Alternatively, if the infoID's relevancy is greater than the desired relevancy, the infoID is included in the resultant infoID set.

The topic search device 137 is configured to perform a topic search based on at least one search term (e.g., provided by a user) against at least one relationship database 184 (e.g., the NORM database 188) to retrieve to one or more topics (filtering criteria) based on the at least one search term. In some embodiments, one or more of the retrieved topics can be used to update filtering criteria, as will be described in greater detail below with reference to FIG. 3. For example, the retrieved topics can be used to select topics from the filtering criteria authorized according to the user's access level to the information retrieval system 108.

The report management system 138 is configured to coordinate delivery of the combined search result as a report (e.g., document format), including online via plugin, or other mechanism including FTP, RSS and/or email. The report management system 138 includes a report device 140 that is configured based on one or more indications from the client device 104 or based on the document delivery configuration (e.g., maintained in the configuration database 122) to request generation of the combined search result as a report (e.g., such as a PDF report) from the reporting system 158. The report device 140 is further configured to transmit the generated report for delivery to the user via the web server 110 or via the delivery system 162.

The network 142 is configured to interconnect the components systems and databases of the information retrieval system 108, including the web server 110, subscriber connection system 118, federated search engine 128, report management system 138, aggregation system 144, suggestion system 148, alert system 152, reporting system 158, delivery system 162, and the backend databases 168. The network 142 can include one or more of a wide area network (WAN), local area network (LAN), virtual private network (VPN), wireless network, as well as any other public or private network, or any combination thereof. The transmission over the network 142 can be accomplished, for example, via Transfer Control Protocol/Internet Protocol (TCP/IP), User Datagram Protocol (UDP)/IP, as well as any combination of conventional protocols or yet to be developed protocols.

The aggregation system 144 (or data mart system) is configured to aggregate information from a variety of sources (not shown) and based on an input of at least one entity to provide an infoID set associated with documents that relate to the inputted at least one entity. The aggregation system 144 is configured to receive at least one search term of the query (e.g., at least one entity) from the federated search engine 128 (e.g., from the primary search device 130). Based on the at least one entity name, an entity relationship device 146 of the aggregation system 144 is configured to determine a set of infoIDs that are associated with content documents (e.g., primary or secondary databases 170, 176) related to the at least one entity name. For example, an entity (e.g., Microsoft®) can be provided to the aggregation system 144, and the entity relationship device 146 can determine an infoID set that relates to the entity, such as infoIDs representing documents that can include cases involving the entity, financial filing for the entity, or any other content documents in the content databases 170, 176 that relate to the entity. The aggregation system 144 is further configured to transmit the determined infoID set to the federated search engine 128.

The suggestion system 148 is configured based on an input of at least one search term to suggest an infoID set associated with documents that relate to the at least one search term. The suggestion system 148 is configured to receive at least one search term of the query from the federated search engine 128 (e.g., from the primary search device 130). Based on the at least one search term, an information suggestion device 150 of the suggestion system 148 is configured to determine an infoID set including infoIDs that represent documents in the content databases (e.g., primary or secondary databases 170, 176), which include terms related to the received at least one search term. The suggestion system 148 is further configured to transmit the determined infoID set to the federated search engine 128.

The alert system 152 is configured to provide alerts to the user when relevant information changes (e.g., when search results or infoID track results of periodic queries change). The alert system 152 includes a search device 154 and an InfoID track device 156.

The alert system 152 can maintain one or more folders (not shown) associated with periodic queries that the user would like to perform periodically (e.g., hourly, daily, weekly, and other periodicities) against content databases (e.g., primary or secondary databases 170, 176) or relationship databases 184. As will be described in greater detail below, alert system 152 can also perform the periodic queries when certain events occur in the information retrieval system 108. An example event that can invoke a periodic query of a particular folder can be one that is associated with one or more updated/new documents (via associated infoIDs) that are loaded into one or more of the content databases 170, 176. For example, upon receipt of an event indicating one or more infoIDs, the alert system 152 can instruct the search device 154 to perform any queries associated with such infoIDs.

Figure 6:
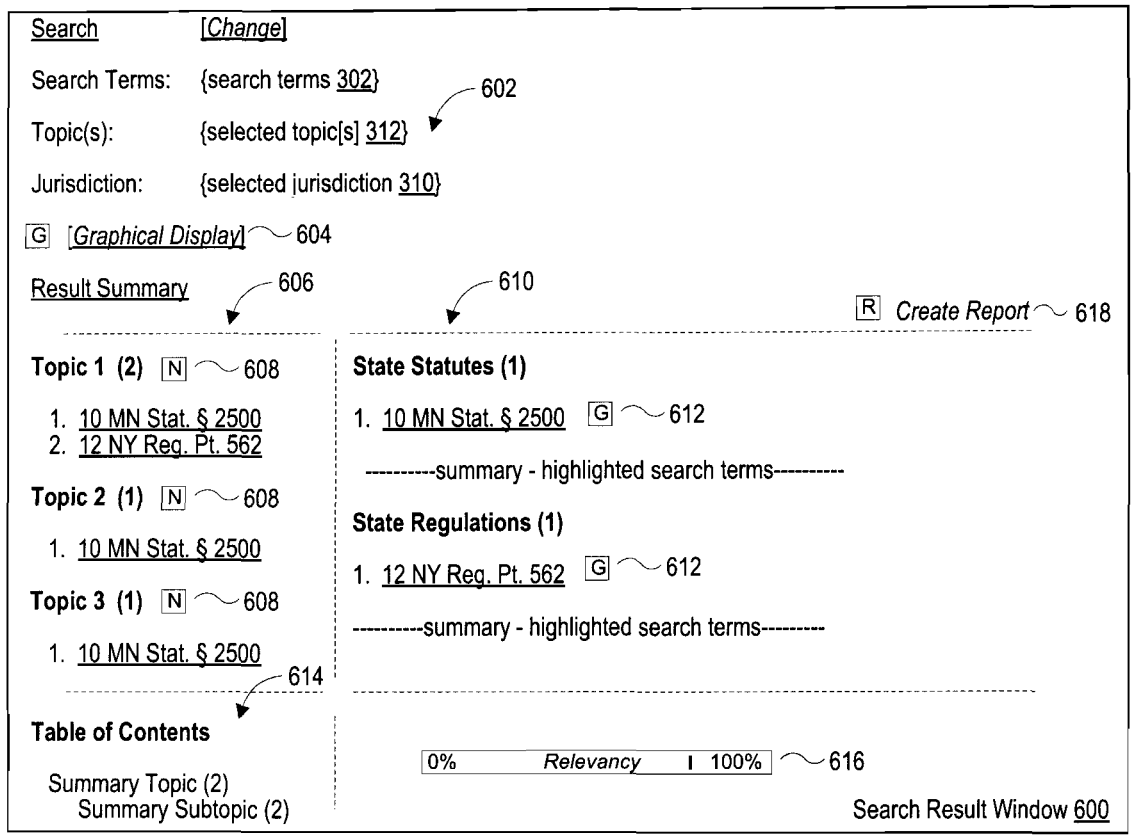
FIG. 6 illustrates an example text search result window to display a result summary of the query in accordance with FIGS. 3 and 4.

A folder can include a search section and a search result section, which can be similar to or different than illustrated FIGS. 3 and 6. The folder can also include an infoID track section, as well as one or more other sections. The folder can also include one or more nested folders, which can be opened by the user to reveal associated search/result sections and infoID track sections. The web server 110 can provide the user via the client device 104 with one or more web pages to configure the queries and periodicities, and/or infoIDs of each respective folder of the alert system 152, as well as to display the search results and infoID track results.

Based on the periodicity set by the user for the query in the folder, the search device 154 can transmit a periodic query to the federated search engine 128 and can receive in response a combined search result (e.g., document content and at least one summary). For a periodically executed query, the search device 154 can maintain a timestamp associated with each periodic execution of the query. The time stamp can be initially set to the date and time when the user configures (e.g., adds or changes) the query. For example, the initial timestamp can be TS=<Dec. 1, 2009>. The search device 154 can request an initial query on the same date as the configuration (e.g., Dec. 1, 2009). After receiving the combined search result, the search device 154 can save the combined result to the result section of the folder and can also save the timestamp to the folder. Additionally, or alternatively, for a received search result of a query, the search device 154 can also request the report management system 138 to generate a report or document of the search result for delivery to the user. Based on the document delivery configuration (e.g., set forth for the user in configuration database 122), the report management system 138 thereafter can deliver the generated document to the user online via one or more web page or plugins, and/or via the delivery system 162, such as via FTP, RSS, and email.

For a later periodic or event-based query, search device 154 is configured to append to the periodic query a timestamp of a previously executed query maintained in the folder. In some embodiments, the timestamp can be associated with the periodic query but can be transmitted separately from the periodic query. For example, if the periodicity is set to "weekly," the query will be requested on Dec. 8, 2009, Dec. 15, 2009, and so on. For each periodic request, the search device 154 can append to the periodic query a previous timestamp, such as TS=<Dec. 1, 2009> for the second query on Dec. 8, 2009, TS=<Dec. 8, 2009> for third periodic query on Dec. 15, 2009, and so on. Similarly, when an event-based query occurs, the next periodically scheduled query can include the timestamp associated with the event-based execution of the periodic query. For example, the search device 154 can append to the periodic query on Dec. 8, 2009, a TS=<Dec. 6, 2009> when the periodic query was last executed due to an event-based query execution. Similarly, the search device 154 can request the report management system 138 to generate a report or document of the search result for delivery to the user. Based on the document delivery configuration (e.g., set forth for the user in configuration database 122), the report management system 138 thereafter can deliver the generated document to the user online via one or more web page or plugins, and/or via the delivery system 162, such as via FTP, RSS, and email.

The federated search engine 128 is configured to receive the first or subsequent periodic query (and the associated timestamp), to execute the periodic query against the content databases, and to provide the combined search result to the alert system 152. It is noted that federated search engine 128 will return search results for documents that have changed from the associated timestamp of a periodic or event-based execution, as will be described in greater detail hereinbelow.

The InfoID track device 156 is configured to retrieve a set of infoIDs from an infoID section of a folder and is further configured to determine whether documents of the content databases (e.g., primary and secondary database 170, 176) associated with the retrieved infoIDs have changed, such as after being updated with amended documents. The determination can be performed periodically (e.g., hourly, daily, and weekly, as well as other periodicities) and event-based by maintaining timestamps associated with the infoIDs. For example, the InfoID track device 156 can access a relationship database 184 (e.g., index database 186) and can retrieve the latest version IDs (e.g., verIDs) associated with the infoIDs. Periodically or based on an event, as described in relation to the search device 154, the InfoID track device 156 can retrieve verIDs for the infoIDs that are tracked, compare these retrieved verIDs to verIDs stored in the folder from a previous periodic or event-based infoID track, and generate a infoID track set that includes at least one infoID the timestamp of which has changed after the timestamp of the previous periodic or event-based infoID track. The InfoID track device 156 is further configured to retrieve at least one document (or portion thereof) from the content databases (e.g., primary and secondary database 170, 176) associated with infoID track set to form a infoID track result. The InfoID track device 156 is also configured to save the infoID track result that includes the retrieved infoID track set and associated at least one document (or portion thereof) to the infoID section of the folder. Additionally, or alternatively, the InfoID track device 156 can also request the report management system 138 to generate a report or document of the infoID track result for delivery to the user. Based on the document delivery configuration (e.g., set forth for the user in configuration database 122), the report management system 138 thereafter can deliver the generated document to the user online via one or more web page or plugins, and/or via the delivery system 162, such as via FTP, RSS, and email.

The reporting system 158 is configured to generate a report or document associated with any result generated by the information retrieval system 108, such as a search result or infoID track result. The report generator device 160 can receive information associated with a report from the alert system 152 or the client device 104 (via web server 110), generates the report from the received information, and returns the generated report to the requesting alert system 152 or the web server 110, for transmission to the user. The received information can include one or more identifiers that indicate the documents associated with the information of the report, such as infoID, docID. The report generator device 160 can access the content documents in the content databases (e.g., primary or secondary databases 170, 176) and/or at least one relationship database 184 to retrieve additional information associated with the report, such as status information of the content documents, or one or more portions of the documents. For example, if the document is a senate bill, the status information can reflect the current status of the bill (e.g., in a legislature) and the retrieved one or more portions of the document can include an introductory paragraph about the bill.

The delivery system 162 is configured to deliver information retrieved from the information retrieval system 108 to the user. The delivery system 162 includes an information delivery device 164 and information subscription device 166.

The information delivery device 162 is configured to receive information (e.g., search result or infoID track result) from the report management system 158 (via the web server 110 or the alert system 142) and to deliver the information to the user according to document delivery configuration (e.g., set forth for the user in configuration database 116), such as via FTP, RSS feed, email. The information subscription device 166 is configured to provide the user with the ability to register for one or more RSS feeds. Based on user input provided via the web server 110 for an RSS feed, the information subscription device 166 is further configured to generate a periodic search via the search device 154 or InfoID track device 156 of the alert system 152 in association with that RSS feed. Upon receipt of a periodic search result or infoID track result, the information subscription device 166 can request the information delivery device 164 to deliver the search result or infoID track result to the client via the associated RSS feed.

The backend databases 168 are configured to maintain content documents and relationships associated with the content documents. More specifically, the backend databases 168 include at least one primary database 170, at least one secondary database 176, and at least one relationship database 184. Sample records of the databases 170, 176 and 184 are described below with reference to FIGS. 2A-2E.

The primary content databases 170 can include a "cases" database 172 that maintains decisions issued by federal and state courts. It should be noted that the "cases" database 172 is representative and multiple "cases" databases can be used instead. For example, a "federal cases" database and a "state cases" database for states or for each state. The primary content databases 170 can also include a "statutes" database 174 that maintains federal and state statutes. It should be noted that the "statutes" database 174 is also representative and multiple "statutes" databases can be used instead. For example, a "federal statutes" database and a "state statutes" database for the states or for each state. Other primary databases can be used, such as federal and state regulations, federal and state bills, and federal agency decisions. Similarly, these primary databases can also be divided by federal and state content documents. Additional or alternate primary content databases 170 can be provided.

The secondary content databases 176 can include at least one secondary content database 178, 180 and 182. For example, the at least one secondary content database 178, 180 and 182 can include law review documents, regulatory guidance documents (e.g., IRS-related documents), agency documents (e.g., IRS regulations documents), as well as myriad other content documents. Additional or alternate secondary content databases 176 can be provided. The at least one secondary content database 178, 180 and 182 can also include other types of content documents. For example, the at least one secondary content database 178, 180 and 182 can include bill summary documents, analytical documents, congressional transcript documents, as well as any other type of content documents.

The relationship databases 184 include relationships associated with the content documents. More specifically, the relationship databases 184 include an index database 186, NORM (Novus Object Relationship Manager) database 188 and NORT (Novus Object Relationship Tree) database 190. The index database 186 can maintain associations of search terms and filtering criteria with metadata. The NORM database 188 can maintain relationships between identifiers and associated metadata. The NORT database 190 can maintain parent-child hierarchical information. The relationship databases 184 will be described in greater detail below with reference to FIGS. 2A-2D.

FIGS. 2A-2D illustrate example records in a plurality of backend databases 168 of an information retrieval system 108 illustrated in FIG. 1 in relation to an example search illustrated in FIG. 3. The backend databases 168 include at least one primary content database 170 and/or at least one secondary content database 176 and at least one relationship database 184 (e.g., relationship databases 186, 188 and 190). The example contents of the foregoing databases are described immediately below. While example records are shown for brevity and clarity, the foregoing databases are configured to maintain large volumes of content and relationship data.

FIG. 2A illustrates example contents of a primary content database 170 (or secondary content database 176). The primary content database 170 maintains content documents associated with one or more searches (queries) performed by the information retrieval system 108. The content documents can be XML documents. For example, a content document can be associated with a Minnesota (MN) state statute, NY state regulation, or another state or federal statute, regulation, bill or agency decision or other content. The content document includes a i) document metadata portion and a ii) document content portion. The document metadata portion of a content document includes an infoID, docID, and verID.

The infoID is an identifier that identifies the content document across content documents of the information retrieval system 108, while a docID is an identifier that identifies an instance of the infoID. For example, the first document and the last document in FIG. 2A are identified by the same infoID (e.g., ID 6) and by different docIDs (e.g., docID1 and docID4). The verID is a timestamp indicating an instance (or point-in-time) of the content document. The document content portion can include the content of a particular statute or regulation, or other content as described herein. For example, the document content of the first document and the fourth document in FIG. 2A is associated with 10 MN Stat. §2500, the document content of the second document is associated with 10 NY Reg. Pt. 562, and the document content of the third document can be any content that is desired to be maintained in the primary content database 170 (or secondary content database 176). For example, document content of the third document can be associated with a NY senate bill 485, or any other content.

FIG. 2B illustrates example records of the index database 186. The index database 186 relates a query (search terms and filtering criteria) in the information retrieval system 108 to docID, infoID and verID of content documents illustrated in FIG. 2A. A record of the index database 186 relates a field name, value, docID, infoID and verID. For example, the first record indicates that a document type "state statutes" is related to docIDs (docID1, docID4), infoIDs (ID6, ID6) and verIDs (TS1, TS4). The first docID is associated with the first infoID and with the first verID. Other docIDs, infoIDs and verIDs are similarly related. The second record indicates that a jurisdiction "MN" is also related to docIDs (docID1, docID4), infoIDs (ID6, ID6) and verIDs (TS1, TS4).

The third record indicates that a document type "state regulations" is related to docID2, infoID ID7 and TS2, and the fourth record indicates that a jurisdiction "NY" is also related to docID2, infoID ID7 and TS2. The last two records indicate relationships of respective search terms of "Srch1" and "Srch2" (e.g., set forth in FIG. 3) to docIDs, infoIDs and verIDs. More specifically, the first search term "Srch1" is related to docIDs (docID1, docID3, docID4), infoIDs (ID6, ID8, ID6) and verIDs (TS1, TS3, TS4), while the second search term "Srch3" is related to docID2, infoID ID7 and verID TS2.

FIG. 2C illustrates example records of the NORM database 188. The NORM database 188 is configured to relate a document (e.g., via its infoID) to at least one base topic and its relevancy for summarization by topic. A first portion of the NORM database 188 includes example self-referencing records associated with topics T1, T2, T3 and T5, which are metadata for the topics and display information related to the topics. A second portion of the NORM database 188 relates document infoIDs to base topics and relevancies. As an example, the document represented by infoID ID6 is related to three base topics, e.g., base topic T1 and relevancy of 86%, to T2 and relevancy of 95%, and T3 And relevancy of 64%. As another example, the document represented by infoID ID7 is related to one topic T1 and relevancy of 73%. The actual topic name can be populated in the base topic field or a lookup table can be maintained by the NORM DB 188 to relate the base topics to actual base topic names, such as T1—"Topic1"; T2—"Topic2" and T3—"Topic 3". It should be noted that the topic names set forth herein are representative examples and can therefore be actual topic names provided according to the topics represented by the content documents of FIG. 2A. There can be other relationships represented in the NORM database 188. For example, the topic can be a family of bills represented by topics a topic B (e.g., B1), which can include the third document identifier by infoID ID8 in FIG. 2A (e.g., NY Sen. Bill 485). Other families can be related in similar fashion, such as patent families, legislative histories, as well as any other families.

FIG. 2D illustrates example records of the NORT database 190. The NORT database 190 is configured to relate one or more child topics to a parent topic using topic expression for summarization by table of contents (TOC). For example, a child topic C1 (e.g., topic T1) can be a child of a summary topic (parent) and can include a value representing a mathematical topic expression—T1 U T2. Accordingly, the TOC can include the summary topic and the child topic. This TOC can be a graph representing children with multiple parents, grandparents, and additional levels of parentage to express higher levels of a topical concept.

FIG. 3 illustrates an example search input window 300 to receive a user query. After logging in, the user can request to perform a search via the information retrieval system 108 of FIG. 1, either online via client device 104 or periodically via the alert system 142. The federated search engine 128 can generate a search input window, such as search input window 300. For example, the search input window 300 can include the following inputs: search terms 302 and filtering criteria, which can include one or more of document types 304; document sections 306; dates 308; jurisdictions 310; selected topic(s) 312; and topic search 314. It should be noted that the filtering criteria is non-exhaustive and additional or alternative filtering criteria can be provided (e.g., agencies, legislative committees). The particular filtering criteria can be based on user's access level to the information retrieval system 108. More specifically, configuration database 122 can include particular filtering criteria that are to be provided to the user (via user ID). For example, only certain topics (e.g., topics 1-5 and topic X) can be provided to the user, while certain other topics may not available to the user based on the user's access level to the information retrieval system 108. Alternatively, the user can have unrestricted access to all topics. Similarly, certain document types 304, document sections 306, dates 308 and jurisdictions 310 can be restricted based on user's access level to the information retrieval system 108.

In addition, the user can perform a topic search 314 based on at least one search term (e.g., Srch3) to retrieve to one or more topics based on the at least one search term. At least one of the retrieved topics can be used as filtering criteria in search input window 300. For example, the retrieved topics can be used to select one or more topics from the available topics in the selected topic(s) 312, which are based on user's access level. If the user has an unrestricted access level to the information retrieval system 108, the topic search device 137 can select all topics resulting from the topic search 314 in the selected topic(s) 312. In some embodiments, for either of the foregoing two scenarios, the selected topic(s) 312 may be displayed after the user performs a topic search 314, with the topics retrieved being selected in the selected topic(s) 312. The user can adjust the topic selection as desired, by selecting or unselecting topics in the selected topic(s) 312. The topic search device 137 of the federated search engine 128 can update the topic selections in the selected topic(s) 312 as indicated above.

As illustrated in the example search input window 300, the user has entered two search terms "Srch1" and "Srch2" into the search terms 302 and has selected the following filtering criteria, including topics selected via search term "Srch3". The filtering criteria selected includes: document type 304—state statutes, state regulations; document sections 306—nothing; dates 308—all; jurisdictions 310—all; and selected topic(s) 312—topics 1, 5.

Figure 4:
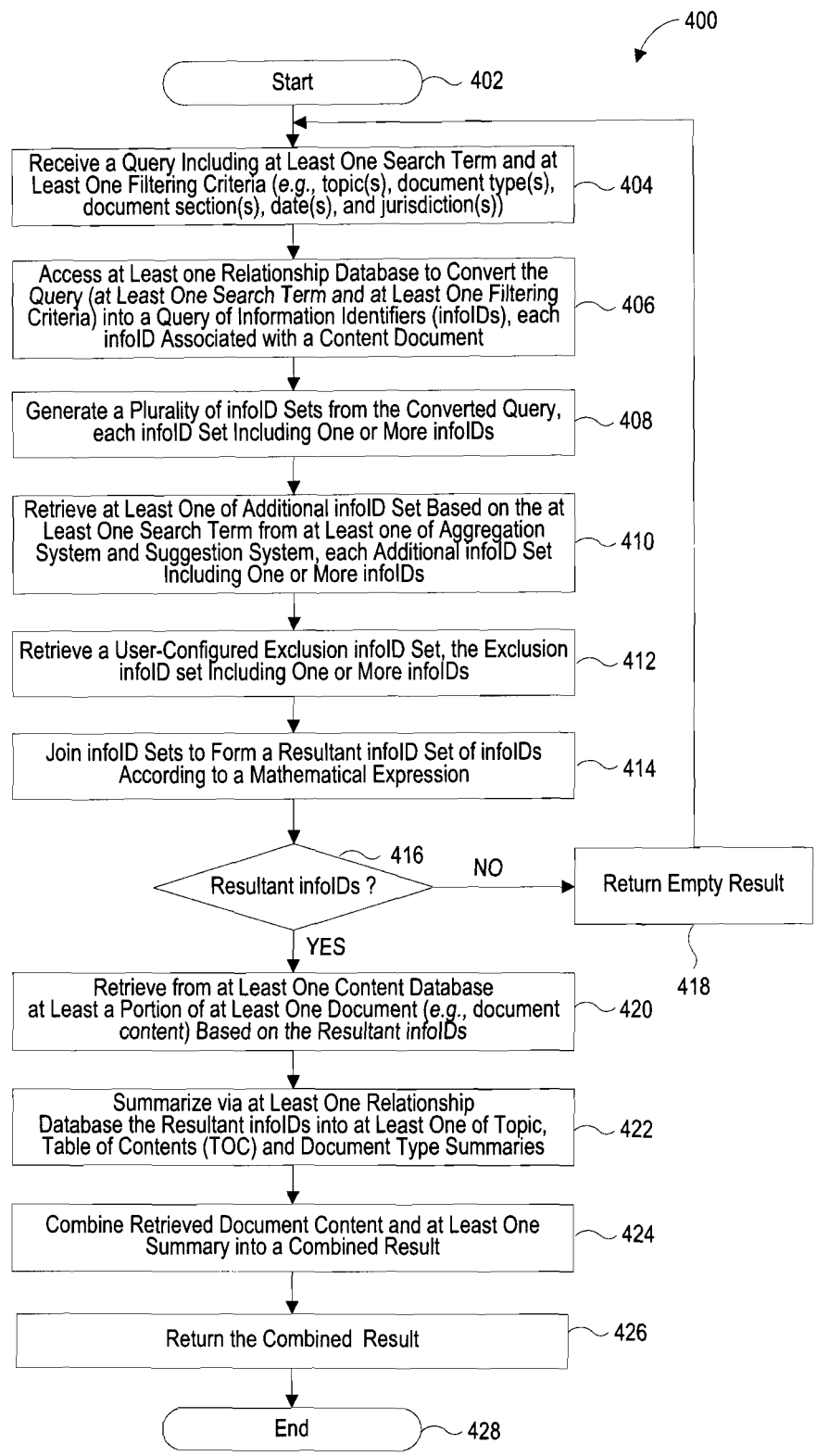
FIG. 4 illustrates a flowchart of an example method for performing a search of at least one content database (primary and/or secondary database) and at least one relationship database illustrated in FIG. 1 in accordance with the query illustrated in the search input window of FIG. 3.

FIG. 4 illustrates a flowchart of an example method for performing a search of at least one content database of FIG. 1 (e.g., primary database 170 and/or secondary database 176) and at least one relationship database 184 in accordance with a query illustrated in the search input window of FIG. 3. The method 400 starts at operation 402. At operation 404, a query that includes at least one search term and at least one filtering criteria is received by federated search engine 128. An example query associated with the selected search terms and filtering criteria of FIG. 3 is illustrated in FIG. 5A. For example, the query can be received by the primary search device 130 from the user via the client device 104 or from the search device 154 of the alert system 152. As an example, the query can include the example search terms and filtering criteria as illustrated in FIG. 3 above. In some embodiments, a timestamp associated with query can be received from the search device 154 of the alert system 152. The timestamp can be received as part of the query or separately.

At operation 406, at least one relationship database is accessed to convert the query (e.g., at least on search term and the at least one filtering criteria) into a query of information identifiers (infoIDs). It is noted that the timestamp is not converted but can be used to filter an infoID resultant set, as described in greater detail below. The example converted query is illustrated in FIG. 5B. Each infoID of the converted query is associated with a related document in the content databases 170, 176. For example, in view of the example queries in FIGS. 5A, 5B and the index database 186 of FIG. 2B, "Srch1" is converted to infoIDs ID6, ID8 and "Srch2" is converted to infoID ID7. In view of the NORM database 188, Topic 1 (T1) is converted to infoID ID6, ID7 and Topic 2 (T2) is converted to infoID ID6. As described hereinabove, a table can be used to relate Topics to (Ts). In view of the index database 186, "State Stats" is converted to infoID ID6 and "State Regs" is converted to infoID ID7.

At operation 408, a plurality of infoID sets is generated from the converted query. Each of the infoID sets can include one or more infoIDs. For example, as shown in example FIGS. 5B, 5C, infoID set A can include infoIDs ID6, ID7, ID8, infoID set B can include infoIDs ID6, ID7, and infoID set C can include infoIDs ID6, ID7.

At operation 410, at least one additional infoID set based on the at least one search term of the query is retrieved from another system, such as the aggregation system 144 and/or the suggestion system 148. The additional sets can include one or more infoIDs. For example, as shown in example FIG. 5C, infoID set D from the aggregation system 144 can include infoID ID6, infoID set E from the suggestion system 148 can include infoIDs ID7.

At operation 412, a user-configured exclusion set of infoIDs is retrieved. For example, as shown in example FIG. 5C, a user-configured exclusion infoID set F retrieved from the configuration database 122 can include infoID ID8. At operation 414, the infoID sets are joined to form a resultant infoID set of infoIDs according to a mathematical expression. For example, as shown in example FIG. 5C, the mathematical expression according to which the infoID sets A-F can be joined can be described as follows: (((Set A∪Set D∪Set E)∩Set B∩Set C)−Set F). While the example resultant infoID set for this example query can include infoIDs ID6, ID7, other resultant infoID sets for the same or other queries can be empty (e.g., no infoIDs result from the mathematical expression). In the foregoing example, infoID set A that is associated with the search terms can be expanded by its union with infoID sets D, E from the aggregation and suggestions systems 144, 148. This intermediate result of infoIDs can then be filtered by its intersection with infoID sets B, C and subtraction of infoID set F.

In some embodiments, infoIDs (e.g., ID6, ID7) of the resultant infoID set can further be filtered according to a predetermined relevancy indication as compared to the relevancies associated with the infoIDs in the NORM database 188. For example, the relevancy indication can be 60%. Because the relevancies of infoIDs ID6, ID7 are greater than the relevancy indication, both infoIDs are retained in the resultant infoID set. The relevancy device 136 can filter the resultant infoID set as set forth above.

Similarly, in some embodiments, the resultant infoID set can also be filtered according to the received timestamp (e.g., from the alert system 152) based on the latest verIDs in the index database 186, which are associated with the infoIDs of the resultant infoID set. As an example, the received timestamp can be <Dec. 1, 2009> and the latest verID for ID6 can be <Oct. 15, 2009> (e.g., TS4). Because the latest verID is before the received timestamp, ID6 can be filtered from the resultant infoID set. As another example, the latest verID for ID7 can be <Dec. 3, 2009> (e.g., TS2). Because the latest verID is after the received timestamp of <Dec. 1, 2009>, ID7 will be not be filtered from the resultant infoID set. For clarity of the following description, none of the infoIDs is filtered from the resultant infoID set.

At operation 416, a determination is made as to whether there are any infoIDs in the resultant infoID set. If it is determined that the resultant set is empty, at operation 418 an empty search result is retuned to client device 104 or alert system 152. The foregoing operations 404-418 can be performed by the primary search device 130 of the federated search system 128, illustrated in FIG. 1. However, if it is determined that the resultant infoID set is not empty, the method 400 continues at operation 420, where at least a portion of at least one document (document content) is retrieved from the at least one content database based on the resultant infoIDs. For example, at least portions of the documents represented by infoIDs ID6, ID7 are retrieved from at least one content database 170, 176.

At operation 422, the resultant infoIDs are summarized via at least on relationship database into at least one summary of topics, table of contents (TOC) and document types. For example, operation 422 can be performed by the secondary search device 132 of the federated search device 128, illustrated in FIG. 1. As an example, the NORM database 188 is accessed and infoID ID6 is used as a key to retrieve topics T1, T2 and T3 for the topics summary. The infoID ID7 is used to retrieve topic T1. As another example, the retrieved topics T1 and T2 are used to access NORT database 190 for the table of contents (TOC) summary, by executing the expression T1∪T2 to generate a summary topic for the topics T1, T2.

At operation 424, the retrieved portions of the document content from operation 420 are combined with the at least one summary into a combined result. For example, operation 424 can be performed by the content combiner device 134 of the federated search system 128, illustrated in FIG. 1. As an example, for the topic summary, the retrieved portions of the documents represented by infoIDs ID6, ID7 are added to topic T1 and infoIDs ID6, ID7 are counted for the topic T1 summary. There are two (2) entries for the topic T1. The retrieved portions of the document represented by infoID ID6 added to the topic T2 and the topic T3, and infoID ID6 is counted for the respective topic summaries. There is one entry for the each of the topics T2, T3. As another example, in the document type summary, the retrieved portions of the documents represented by infoIDs ID6, ID7 are added to state statues and state regulations, respectively, and counted for each document type.

At operation 428, the combined result is retuned. For example, the federated search system 128 returns the combined result to client device 104 or to the search device 154 of the alert system 152. The method 400 end at operation 428.

FIG. 5A illustrates an example query generated in accordance with the query illustrated in the search input window of FIG. 3. The query can be key-value pairs indicating search terms and filtering criteria entered via the example search input window 300 of FIG. 3. As example search terms, the following key-value pairs can be provided: Trm1=Srch1 and Trm2=Srch 2. The search terms can be separated by connector, such as Cx=or. As example filtering criteria, the following key-value pairs can be provided: Tpk1=Topic 1 and Tpk2=Topic 5. As other filtering criteria, the following key-value pairs can be provided: Typ1=State Stats; and Typ2=State Regs. In similar fashion, the foregoing filtering criteria can be separated by connectors.

FIG. 5B illustrates the example query of FIG. 5A converted into a query of information identifiers (infoIDs) in accordance with at least one relationship database illustrated in FIG. 1. In similar fashion to FIG. 5A, the query can be key-value pairs indicating search terms and filtering criteria entered via the example search input window 300 of FIG. 3 and converted to infoIDs. As example search terms, the following key-value pairs can be provided: Trm1=ID6, ID8 and Trm2=ID7. As an example filtering criteria, the following key-value pairs can be provided: Tpk1=ID6, ID7 and Tpk2=Null. As other filtering criteria, the following key-value pairs can be provided: Typ1=ID6; and Typ2=ID7. In similar fashion to FIG. 5A, the can be separated by connectors as shown on FIG. 5B.

FIG. 5C illustrates at least one infoID set generated from the query of FIG. 5B, at least one additional infoID set retrieved from at least one system of FIG. 1, as well as a resultant infoID set generated from the infoID sets according to a mathematical expression. InfoID sets A-C are generated from the converted query of FIG. 5B. Each of the infoID sets can include one or more infoIDs. For example, infoID set A can include infoIDs ID6, ID7, ID8, infoID set B can include infoIDs ID6, ID7, and infoID set C can include infoIDs ID6, ID7. InfoID sets D and E based on the at least one search term of the query can be retrieved from the aggregation system 144 and the suggestion system 148. For example, infoID set D can include infoID ID6 and infoID set E can include infoIDs ID7. A user-configured exclusion infoID set F is retrieved from the configuration database 122 of the subscriber connection system 118. For example, infoID set F can include infoID ID8. The foregoing additional infoID sets can include one or more infoIDs. The infoID sets are joined to form a resultant infoID set of infoIDs according to a mathematical expression. For example, as shown in example FIG. 5C, the mathematical expression can be described as follows: (((Set A∪Set D∪Set E)∩Set B∩Set C)−Set F). The example resultant set according to the mathematical expression can include infoIDs ID6, ID7.

FIG. 6 illustrates an example text search result window 600 to display a result summary (combined result) of the query in accordance with FIGS. 3 and 4. The search result window 600 displays the search terms 302 and filter criteria 602, including the topics 312 and jurisdictions 310 of FIG. 3, which were used to generate the search result window 600. A graphical display link 604 is configured to facilitate the display of the results summary (combined result generated in FIG. 4) as a graphical display, as will be described in greater detail below with reference to FIG. 7. The user can click the graphical display link 604, which instructs the graphical navigation device 114 to display the results summary (combined result) as the graphical search result window 700. The results summary can include documents (or portions thereof) retrieved as a result of the query of FIG. 3 against backend databases 168 to be summarized by at least one of topic summary 606, document type summary 610 and table of contents (TOC) summary 614.

The topic summary 606 includes topic 1, topic 2, and topic 3 and documents (or portions thereof) summarized by each of the topics. For example, topic 1 includes two (2) documents. The first document of topic 1 is "10 MN Stat §2500" which is a portion of the document in the content database (e.g., primary database 170 or secondary database 176) identified by infoID ID6. The second document of topic 1 is "12 NY Reg Pt. 562" which is a portion of the document in the content database (e.g., primary database 170 or secondary database 176) identified by infoID ID7, as indicated in the relationship databases 184. Topics 2 and 3 each includes one (1) document "10 MN Stat §2500" identified by infoID ID6. A topic can be associated with topic navigation icon 608, which is configured to facilitate the display of a topic associated with topic navigation icon 608 and topics related to that topic, as will be described in greater detail below with reference to FIG. 8. The user can click topic navigation icon 608, which instructs the topic navigation device 115 to display the topic map window 800 of FIG. 8.

The document type summary 610 includes state statutes and state regulations and documents (or portions thereof) summarized by each document type. For example, the state statutes document type includes one (1) document. Specifically, state statutes document summary includes "10 MN Stat §2500," which is a portion of the document in the content database (e.g., primary database 170 or secondary database 176) identified by infoID ID6. As another example, the state regulations document summary type also includes one (1) document. Specifically, state regulations includes "12 NY Reg Pt. 562," which is a portion of the document in the content database (e.g., primary database 170 or secondary database 176) identified by infoID ID7. A document can also be associated with graphical display icon 612, which is configured to facilitate the display of the document type summary and topic summary associated with that document as a graphical display, as will be described in greater detail below with reference to FIG. 7. The user can click the graphical display icon 612, which instructs the graphical navigation device 114 to display the summary associated with the document in the graphical search result window 700.

The TOC summary 614 includes a summary topic, summary subtopic and documents (or portions thereof) summarized by each of summary topic and subtopic. For example, the topic expression T1 U T2 is evaluated from information contained within the NORM database 188 and determined to include infoIDs ID6, ID7. Accordingly, the child C1 from the NORT database 190 has a summarized value of two (2) and its parent P1 is a summary of all the documents that its children contain and thus also has a value of two (2).

The search result window 600 also includes a relevancy slider 616 (or another relevancy indicator), which is configured facilitate the display more or fewer documents (or portions thereof) summarized by the different summaries based on the relevancy percentages associated with the documents in the NORM database 188 of FIG. 2C. More specifically, adjustment of the relevancy slider 614 instructs the relevancy device 136 of the federated search system 128 to adjust documents (or portions) thereof that are considered or used in the search result window 600 by determining which document are included/excluded based on the relevancy field of the NORM database 188. For example, if the relevancy slider 616 is adjusted by the user via the client device 104 to 72%, then the document represented by ID7 (12 NY Reg. Pt. 562) will not be included in the topic summary (e.g., topic 1), in the document type summary (e.g., state regulations) and the TOC summary of contents because its relevancy is indicated to be 73% in the NORM database 188.

Further, the search result window 600 includes a report creator icon 618 which facilitates the creation of a report associated with the results summary (combined result) displayed in the search result window 600. More specifically, clicking the report icon 618 instructs the report management system 138 to generate the report associated with the results summary and to deliver the report to the client device 104. The report management system 138 can request the reporting system 158 to generate the report, which can be delivered to the client device 104 as a web page or as a document (PDF) via the web server 110. The user can also select to deliver the result as an email, FTP, RSS via a report web page that the report management device 138 can transmit to the client device 104 via web server 110 to obtain the type of delivery from the user.

Figure 7:
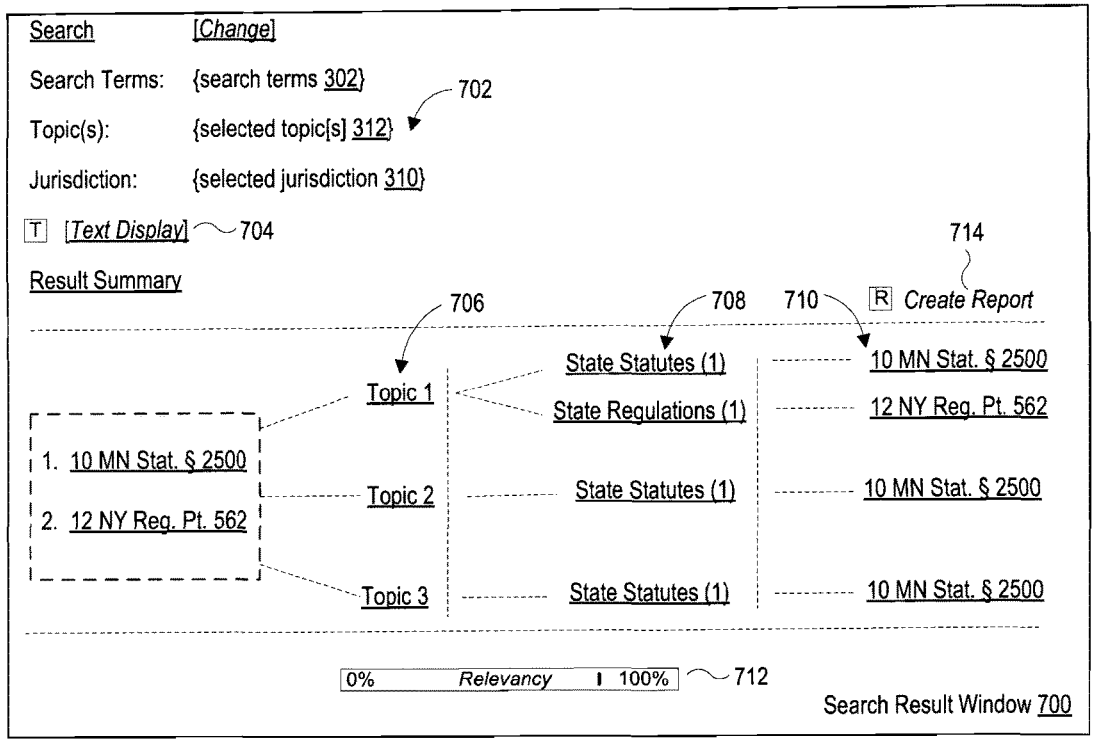
FIG. 7 illustrates an example graphical search result window to display a results summary of the search in accordance with FIG. 6.

FIG. 7 illustrates an example graphical search result window 700 to display a result summary (combined result) in accordance with FIG. 6. The search result window 700 displays the search terms 302 and filter criteria 702, including the topics 312 and jurisdictions 310 that were used to generate the search result window 600 of FIG. 6. A textual display link 704 is configured to facilitate the display of the results summary as a textual display illustrated in FIG. 6. The user can click the textual display link 704, which instructs the graphical navigation device 114 to re-display the results summary (combined result) of the textual search result window 600 of FIG. 6.

The search result window 700 can be displayed as a result of clicking the graphical display link 604 in FIG. 6. The results summary of FIG. 7 extends from the dotted box, which includes the documents (or portions thereof) retrieved as a result of the query of FIG. 3 (e.g., 10 MN Stats §2500 and 12 NY Reg. Pt. 562). The documents are displayed as related to the topic summary 706 (e.g., topic 1, topic 2 and topic 3). Clicking on a topic, displays document type summary 708 associated with foregoing documents. Clicking on a document type, displays the documents 710 of the document type summary 708.

The search result window 700 can also be displayed as a result of clicking the graphical display icon 612 in FIG. 6. In this case, the results summary of FIG. 7 extends from the dotted box, which includes only the document (or portions thereof) associated with graphical display icon 612 (e.g., 10 MN Stats §2500 or 12 NY Reg. Pt. 562). For example, in the case of document 10 MN Stats §2500, the document is displayed as related to the topic summary 706 (e.g., topic 1, topic 2 and topic 3). Clicking on a topic, displays document type summary 708 associated with foregoing documents. In this case, only the state statutes document type is displayed. Clicking on a document type, displays the documents 710 of the document type summary 708 (e.g., 10 MN Stats §2500). The relevancy slider 712 and report creator 714 operate similarly to the relevancy slider 616 and report creator 618 of FIG. 6, respectively.

Figure 8:
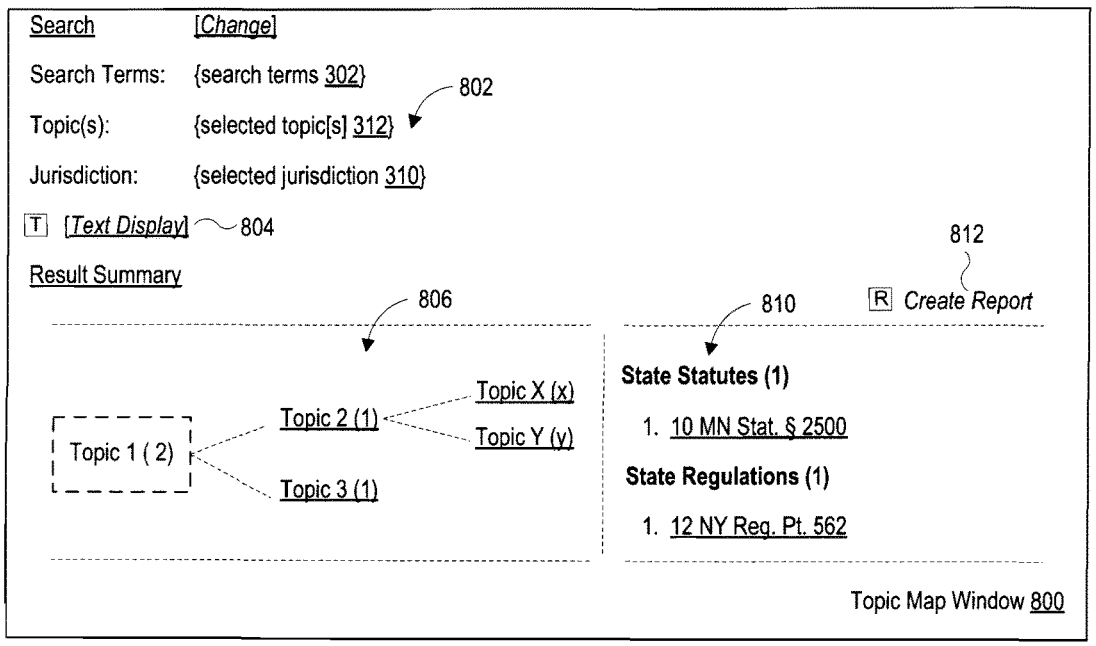
FIG. 8 illustrates an example topic map result window to display related topics of a topic selected from the search result window illustrated in FIG. 6.

FIG. 8 illustrates an example topic map result window 800 to display related topics of a topic selected from the search result window 600 illustrated in FIG. 6. The topic map window 700 displays the search terms 302 and filter criteria 802, including the topics 312 and jurisdictions 310 that were used to generate the search result window 600 of FIG. 6. A textual display link 804 is configured to facilitate the display of the results summary as a textual display illustrated in FIG. 6. The user can click the textual display link 804, which instructs the topic navigation device 115 to re-display the results summary (combined result) of the textual search result window 600 of FIG. 6.

The topic map window 800 can be displayed as a result of clicking the topic navigation icon 608 in FIG. 6. The topic map of FIG. 8 includes a topic map 806, which extends from the dotted box that includes the selected topic (from the search result window 600 of FIG. 6). Based on the selected topic (e.g., topic 1), the topic navigation device 115 accesses at least relationship database 184 (e.g., NORM 188) to retrieve at least one other topic related to the selected topic. This can be accomplished by determining which infoIDs associated with topic 1 (e.g., topic T1 in NORM database 188) are also associated with other one or more topics. For example, based on the example records in NORM database 188, ID6 and ID7 of topic T1 are also related to topics T2 and T3.

Accordingly, related topics T2 and T3 are shown the topic map 806 as being related to topic T1. Clicking or selecting a related topic (e.g., topic T2), instructs the topic navigation device 115 to determine and display one or more topics related to that selected topic. As an example, although not in the example records of the NORM database 188, topics X and Y could be displayed. The relationships in the topic map 806 can be expanded by selecting successive related topics. For a selected topic from the topic map 806, a citation list of documents summarized by document type can be displayed for that selected topic. For example, for selected topic T1, citation list 810 can be displayed, which can be similar to document type summary 610 associated with infoID ID6 (e.g., 10 MN Stat. §2500) and ID7 (e.g., 12 NY Reg. Pt. 562). A create report icon 812 operates in a similar fashion to the create report icon 714 of FIG. 7.

Figure 9:
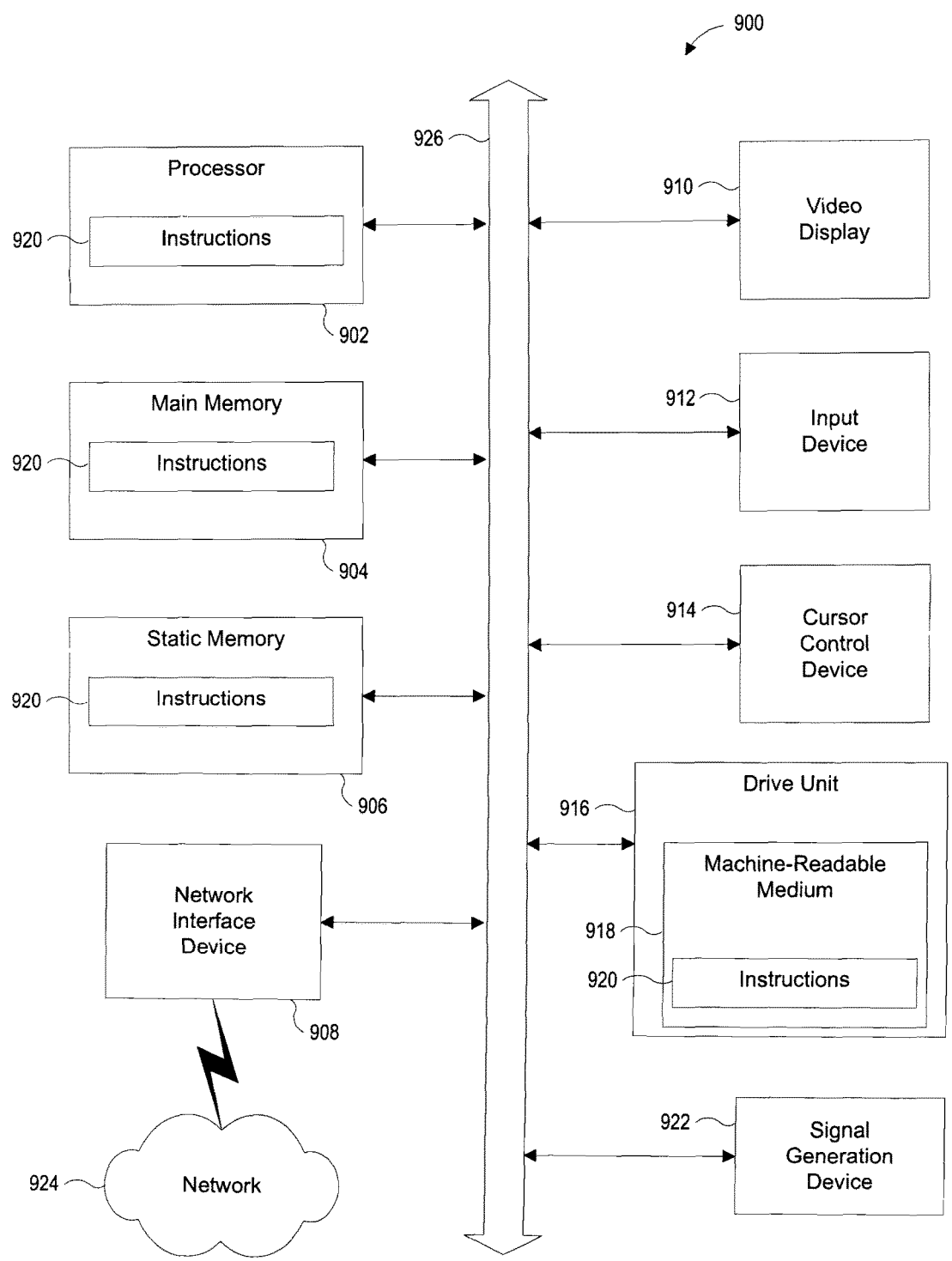
FIG. 9 is a block diagram of a general computer system.

FIG. 9 is a block diagram of a general computer system 900. The computer system 800 can include a set of instructions that can be executed to cause the computer system 900 to perform any one or more of the methods or computer based functions disclosed herein with respect to FIGS. 1-8. The computer system 900 or any portion thereof, may operate as a standalone device or may be connected (e.g., using a network 924) to other computer systems or devices disclosed herein with respect to FIGS. 1-8. For example, the computer system 900 can include or be included within any one or more of the computing device, web server, or any other devices or systems disclosed herein with respect to FIGS. 1-8.

In a networked deployment, the computer system 900 may operate in the capacity of a server or a client machine in a server-client network environment, or a peer machine in a peer-to-peer (or distributed) network environment. The computer system 900 can also be implemented as or incorporated into various devices, such as a personal computer (PC), a tablet PC, a personal digital assistant (PDA), a web appliance, a communications device, a mobile device, a wireless telephone, a server, client or any other machine capable of executing a set of instructions (sequential or otherwise) that specify actions to be taken by that machine. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 can include a processor 902, e.g., a central processing unit (CPU), a graphics-processing unit (GPU), or both. Moreover, the computer system 900 can include a main memory 904 and a static memory 906 that can communicate with each other via a bus 926. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 922, such as a speaker or remote control, and a network interface device 908.

In a particular embodiment, as depicted in FIG. 9, the disk drive unit 916 may include a machine or computer-readable medium 918 in which one or more sets of instructions 920 (e.g., software) can be embedded. Further, the instructions 920 may embody one or more of the methods or logic as described herein with reference to FIGS. 1-8. In a particular embodiment, the instructions 920 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with the various embodiments, the methods described herein may be implemented by software programs that are tangibly embodied in a processor-readable medium and that may be executed by a processor. Further, in an example, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software which implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Thus, an information retrieval system and method to retrieve relevant information have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A method of retrieving information, the method comprising:
receiving a query that includes at least one search term and at least one filtering criteria;
accessing at least one relationship database, wherein the at least one relationship database comprising one or more of a plurality of associations of search terms and filtering criteria with metadata, a plurality of relationships between information identifiers (infoIDs) and associated metadata or a plurality of parent-child hierarchical relationships, to convert the at least one search term and the at least one filtering criteria of the query into a converted query comprising one or more information identifiers (infoIDs) using one or more of the plurality of associations of search terms and filtering criteria with metadata, the plurality of relationships between the infoIDs and associated metadata or the plurality of parent-child hierarchical relationships maintained in the at least one relationship database, wherein each information identifiers of the converted query identifies a content document in at least a primary content database or a secondary content database, the primary content database comprising at least one set of documents related to legal cases or statutes, the secondary content database comprising at least one set of documents related to law review documents, regulatory guidance documents or agency documents, generating a plurality of information identifier sets from the converted query, wherein the information identifier sets are associated with the least one search term and one filtering criteria, and each information identifier set comprises one or more information identifiers;

joining at least the plurality of infoID sets of the converted query according to a mathematical expression to form a resultant infoID set that includes at least one resultant infoID;

retrieving at least a portion of a content document represented by the at least one resultant infoID;

summarizing the at least one resultant infoID into at least one summary; and combining the retrieved portion of the content document into the at least one summary of a combined result based on the associated at least one resultant infoID.

2. The method of retrieving information according to claim 1, the method further comprising:
receiving the query from a device once or periodically.

3. The method of retrieving information according to claim 1, the method further comprising:
receiving a search term; and
accessing at least one relationship database to retrieve the at least one filtering criteria associated with the search term.

4. The method of retrieving information according to claim 1, the method further comprising:
retrieving at least one additional infoID set associated with one of a user-configured exclusion, entity relationship and suggested relationship to at least one search term; and
joining the plurality of infoID sets and the at least one additional infoID set according to the mathematic expression to form the resultant infoID set.

5. The method of retrieving information according to claim 1, the method further comprising:
receiving a first timestamp; and
accessing at least one relationship database to filter an infoID from the resultant infoID set based on a comparison of the first timestamp and a second timestamp associated with the infoID maintained in the at least one relationship database.

6. The method of retrieving information according to claim 1, wherein summarizing includes:
accessing at least one relationship database to determine association of the least one resultant infoID with the at least one summary; and
generating a count of the least one resultant infoID associated with the at least one summary.

7. The method of retrieving information according to claim 1, the method further comprising transmitting the combined result to a device.

8. The method of retrieving information according to claim 7, the method further comprising:
receiving a display indication from the device;
converting the combined result between a textual result and a graphical result based on the indication; and
transmitting the converted result to the device.

9. The method of retrieving information according to claim 7, the method further comprising:
receiving a relevancy indication from the device; accessing at least one relationship database to determine an infoID whose relevancy is below the received relevancy indication; and
updating the combined result to exclude a portion of a content document associated with the infoID from the at least one summary of the combined result.

10. The method of retrieving information according to claim 7, the method further comprising:
receiving an indication from the device concerning a topic of the at least one summary;
accessing at least one relationship database to retrieve at least one related topic based on at least one infoID associated with the topic also being associated with the at least one related topic;
generating a topic map display showing relationship between the topic and the at least one related topic; and
transmitting the topic map to the device.

11. The method of retrieving information according to claim 1, the method further comprising:
generating a report based on the combined result; and
transmitting the report to a device.

12. A system to retrieve information, the system comprising:
a processor; and
a machine-readable storage medium comprising instructions that, when executed by the processor, cause the processor to perform operations comprising:
receiving a query that includes at least one search term and at least one filtering criteria;
accessing at least one relationship database, wherein the at least one relationship database comprising one or more of a plurality of associations of search terms and filtering criteria with metadata, a plurality of relationships between information identifiers (infoIDs) and associated metadata or a plurality of parent-child hierarchical relationships, to convert the query into a converted query comprising one or more information identifiers (infoIDs) using, one or more of the plurality of associations of search terms and filtering criteria with metadata, the plurality of relationships between the infoIDs and associated metadata or the plurality of parent-child hierarchical relationships maintained in the at least one relationship database, wherein each information identifiers of the converted query identifies a content document in at least a primary content database or a secondary content database, the primary content database comprising at least one set of documents related to legal cases or statutes, the secondary content database comprising at least one set of documents related to law review documents, regulatory guidance documents or agency documents,
generate a plurality of information identifier sets from the converted query, wherein the information identifier sets are associated with the least one search term and one filtering criteria, and each information identifier set comprises one or more information identifiers;

joining at least the plurality of infoID sets of the converted query according to a mathematical expression to form a resultant infoID set that includes at least one resultant infoID;

retrieving at least a portion of a content document represented by the at least one resultant infoID;

summarizing the at least one resultant infoID into at least one summary; and combining the retrieved portion of the content document into the at least one summary of a combined result based on the associated at least one resultant infoID.

13. The system to retrieve information according to claim 12, wherein the operations further comprise:
receiving the query from a device once or periodically.

14. The system to retrieve information according to claim 12, wherein the operations further comprise:
receiving a search term; and accessing at least one relationship database to retrieve the at least one filtering criteria associated with the search term.

15. The system to retrieve information according to claim 12, wherein operations further comprise:
retrieving at least one additional infoID set associated with one of a user-configured exclusion, entity relationship and suggested relationship to at least one search term; and
joining the plurality of infoID sets and the at least one additional infoID set according to the mathematic expression to form a resultant infoID set.

16. The system to retrieve information according to claim 12, wherein the operations further comprise:
receiving a first timestamp; and
accessing at least one relationship database to filter an infoID from the resultant infoID set based on a comparison of the first timestamp and a second timestamp associated with the infoID maintained in the at least one relationship database.

17. The system to retrieve information according to claim 12, wherein the operations further comprise:
accessing at least one relationship database to determine association of the least one resultant infoID with the at least one summary; and
generating a count of the least one resultant infoID associated with the at least one summary.

18. The system to retrieve information according to claim 12, wherein the operations further comprise transmitting the combined result to a device.

19. The system to retrieve information according to claim 18, wherein the device is a client device or an alert system device.

20. The system to retrieve information according to claim 18, wherein the operations further comprise:
receiving a display navigation from the device;
converting the combined result between a textual result and a graphical result based on the indication; and
transmitting the converted result to the device.

21. The system to retrieve information according to claim 18, wherein the operations further comprise:
receiving a relevancy indication from the device;
accessing at least one relationship database to determine a infoID whose relevancy is below the received relevancy indication; and
updating the combined result to exclude a portion of a content document associated with the infoID from the at least one summary of the combined result.

22. The system to retrieve information according to claim 18, wherein the operations further comprise:
receiving an indication from the device concerning a topic of the at least one summary;
accessing at least one relationship database to retrieve at least one related topic based on at least one infoID associated with the topic also being associated with the at least one related topic;
generating a topic map display showing relationship between the topic and the at least one related topic; and
transmitting the topic map to the device.

23. The system to retrieve information according to claim 12, wherein the operations further comprise:
generating a report based on the combined result; and
transmitting the report to a device.

24. A method of retrieving information, the method comprising:
receiving a query that includes at least one search term and at least one filtering criteria;
accessing at least one relationship database to convert the query into a converted query comprising one or more information identifiers (infoIDs), wherein each information identifiers of the converted query identifies a content document in at least a primary content database or a secondary content database, the primary content database comprising at least one set of documents related to legal cases or statutes, the secondary content database comprising at least one set of documents related to law review documents, regulatory guidance documents or agency documents;
generating a plurality of information identifier sets from the converted query, wherein the information identifier sets are associated with the least one search term and one filtering criteria, and each information identifier set comprises one or more information identifiers;
joining at least the plurality of infoID sets of the converted query according to a mathematical expression to form a resultant infoID set that includes at least one resultant infoID;
retrieving at least a portion of a content document represented by the at least one resultant infoID;
summarizing the at least one resultant infoID into at least one summary; and
combining the retrieved portion of the content document into the at least one summary of a combined result based on the associated at least one resultant infoID.

25. The method of retrieving information according to claim 24, the method further comprising:
receiving the query from a device once or periodically.

26. The method of retrieving information according to claim 24, the method further comprising:
receiving a search term; and
accessing at least one relationship database to retrieve the at least one filtering criteria associated with the search term.

27. The method of retrieving information according to claim 24, the method further comprising:
retrieving at least one additional infoID set associated with one of a user-configured exclusion, entity relationship and suggested relationship to at least one search term; and
joining the plurality of infoID sets and the at least one additional infoID set according to the mathematic expression to form the resultant infoID set.

28. The method of retrieving information according to claim 24, the method further comprising:
receiving a first timestamp; and accessing at least one relationship database to filter an infoID from the resultant infoID set based on a comparison of the first timestamp and a second timestamp associated with the infoID maintained in the at least one relationship database.

29. The method of retrieving information according to claim 24, wherein summarizing includes:
   accessing at least one relationship database to determine association of the least one resultant infoID with the at least one summary; and
   generating a count of the least one resultant infoID associated with the at least one summary.

30. The method of retrieving information according to claim 24, the method further comprising transmitting the combined result to a device.

31. The method of retrieving information according to claim 30, the method further comprising:
   receiving a display indication from the device;
   converting the combined result between a textual result and a graphical result based on the indication; and
   transmitting the converted result to the device.

32. The method of retrieving information according to claim 30, the method further comprising:
   receiving a relevancy indication from the device; accessing at least one relationship database to determine an info ID whose relevancy is below the received relevancy indication; and
   updating the combined result to exclude a portion of a content document associated with the infoID from the at least one summary of the combined result.

33. The method of retrieving information according to claim 30, the method further comprising:
   receiving an indication from the device concerning a topic of the at least one summary;
   accessing at least one relationship database to retrieve at least one related topic based on at least one infoID associated with the topic also being associated with the at least one related topic;
   generating a topic map display showing relationship between the topic and the at least one related topic; and
   transmitting the topic map to the device.

34. The method of retrieving information according to claim 24, the method further comprising:
   generating a report based on the combined result; and
   transmitting the report to a device.

* * * * *